UNITED STATES PATENT OFFICE.

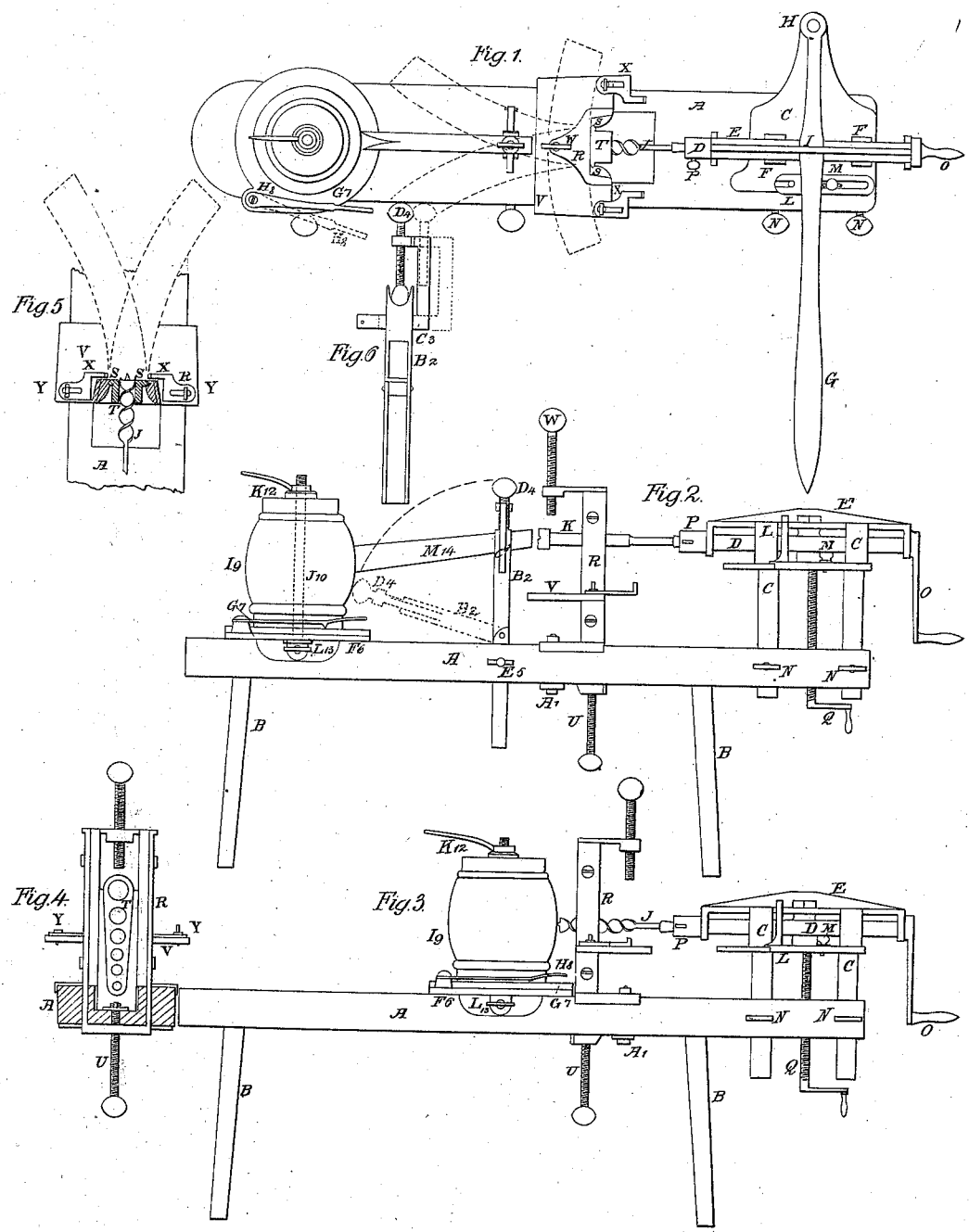

CHAUNCEY COWDRY, ORRIN TOLLS, AND CHAUNCEY C. TOLLS, OF ITHACA, NEW YORK.

WHEELWRIGHT'S BORING AND TENONING MACHINE.

Specification of Letters Patent No. 12,776, dated May 1, 1855.

*To all whom it may concern:*

Be it known that we, CHAUNCEY COWDRY, ORRIN TOLLS, and CHAUNCEY C. TOLLS, of Ithaca, in the county of Tompkins and State of New York, have invented a new and useful Improvement on Machines for Boring and Tenoning for the use of Carriage and Cabinet Makers; and we do hereby declare that the following is a full, clear, and exact description and operation of the same, reference being had to the annexed drawings, making a part of this specification, in which—

Figure 1 is a birdseye view; Fig. 2, a side elevation showing the manner of holding and tenoning spokes. Fig. 3, is also a side elevation showing the position of the machine when boring a carriage hub. Figs. 4, 5, 6, are sectional views.

A A is the bench or platform to which the parts are attached.

B B are the legs on which the bench stands.

C C is the frame in which the mandrel holding the bit or auger slides; D D, the mandrel; E E, a sliding clasp inclosing the mandrel D near each end and sliding in gains or recesses in the top of the posts of the frame C, shown in Fig. 1 at F; G, the lever attached by a pin or screw to a stud in the frame at H, and passing through the sliding clasp E, at I, Fig. 1; J J, bit or auger; K, hollow auger for tenoning; L, a movable slotted stop, for regulating the depth of holes, and the length of tenons, and secured to the frame C, by the screw M; N N, screws for securing the frame C at the required height; O O, crank on the back end of the mandrel; P, screw for holding the bit or auger; Q, screw for raising the frame C; R R, a frame with perpendicular and parallel groove in the inner side of its posts, the grooves shown at S, Figs. 1 and 5, and containing a graduated and sliding scale of tubes T for the guiding of the bits and augers when in use, the tubes T being raised or lowered by means of the screw U; V V, table projecting from the frame R on which work is placed for boring; the work secured in place by means of the screw W; through the upper projecting part of the frame R; X X, adjustable gages used as shown in Fig. 5, for boring the ends of fellies; and being thrown back as shown in Fig. 1, when boring the fellies for spokes, the dotted lines showing the position of the fellies; Y Y, screws for holding the adjustable gages X; shown in Figs. 4 and 5; $A^1$, bolt for holding frame R; $B^2$, a support for the spoke in tenoning having a notch in its upper end, to receive the spoke as shown in Fig. 6, and a joint or hinge near the bench A, Fig. 2, so that it may be moved down to the position indicated by the dotted lines in Fig. 2; that the hub may be turned from one spoke to another in tenoning without releasing the hub from the index on which it stands; $C^3$, a sliding screw clamp, attached to support $B^2$, by the lower angle passing loosely through the support near its upper end, as shown in Fig. 6; $D^4$, screw forming part of the clamp $C^3$; $E^5$, screw for securing the support at the proper height under the spoke; $F^6$, bed plate with flanges projecting down each side of the bench A, for guides; $G^7$, index turning on a center, having any number of spaces required, and resting upon the bed plate $F^6$; $H^8$, spring having the index point; $I^9$, represents a carriage hub fastened upon the index by means of the bolt $J^{10}$, and the nut $K^{12}$; $L^{13}$ screw for fastening in position the bed plate $F^6$; $M^{14}$, spoke in position for tenoning Fig. 2.

*Description of operation.*—For boring a hub reverse the position of the frame R, as shown in Fig. 3, place the hub upon the index and fasten with the nut $K^{12}$, raise or lower as the case requires the graduated scale of sliding tubes, until the proper size is at the required height, by means of the screw U; also graduate the height of the frame C, and fasten by the screws N N, place the index point upon the required number of spaces on the index plate, regulate the position of the movable stop L, so that the lever G will stop the forward movement of the auger when the hole is deep enough, place the left hand upon the lever G, the right upon the crank O, press lightly with the left hand and turn briskly with the right, until the lever G, strikes the stop L; then draw back the lever G, raise the index point, and turn the index and hub one space, and repeat the operation until the hub is bored. If two or more holes are required for each mortise, raise or lower as the case may be, the tubes T, the frame C, and repeat as before.

*For tenoning spokes.*—After the spokes are driven in the hub, place the hub upon the index as shown in Fig. 2, fasten as before described raise the support $B^2$, in a perpendicular position, so that the spoke will rest firmly in the notch as shown in Figs. 2 and 6. Operate with the hollow auger as in boring, placing the movable stop so that the shoulder of the tenon will be at the required distance from the hub, when the tenon is made turn back the screw $D^4$, draw forward the clamp $C^3$, as shown by the dotted lines in Fig. 2, turn down the spoke support as shown by the dotted lines in Fig. 2, so that the spokes may pass over it when the index and hub are turned, turn to the next spoke and raise the support and fasten with the clamp and repeat until all are done. For boring fellies for doweling place the felly upon the table V, as shown by the dotted lines in Fig. 5, between the adjustable gages X X, fasten with the screw W, adjust the height of the graduated tubes as before, and the stop L, operate as first described until the hole is bored, change the ends and repeat. For boring the sides of fellies for spokes, turn back the gages as shown in Fig. 1, place the felly as shown by the dotted lines across Fig. 1, fasten as before, and operate the machine as first described boring through the felly.

What we claim and desire to secure by Letters Patent is—

1. The combination and arrangement of the frame R, with the scale of graduated and sliding tubes T, and screw U as described.

2. The combination of the hinged support $B^2$, with the sliding screw clamp $C^3$, substantially as described.

3. We claim the combined arrangement of the several parts substantially as described and set forth.

CHAUNCEY COWDRY.
ORRIN TOLLS.
CHAUNCEY C. TOLLS.

Witnesses:
WM. H. AKINS,
A. M. BAKER.